United States Patent

Miller

(10) Patent No.: US 12,466,365 B2
(45) Date of Patent: Nov. 11, 2025

(54) VEHICLE BRAKING METHOD AND SYSTEM

(71) Applicant: Bendix Commercial Vehicle Systems LLC, Avon, OH (US)

(72) Inventor: Justin R. Miller, Elyria, OH (US)

(*) Notice: Subject to any disclaimer, the term of this patent is extended or adjusted under 35 U.S.C. 154(b) by 223 days.

(21) Appl. No.: 18/066,457

(22) Filed: Dec. 15, 2022

(65) Prior Publication Data

US 2024/0198982 A1 Jun. 20, 2024

(51) Int. Cl.
*B60T 7/22* (2006.01)
*B60Q 9/00* (2006.01)
*B60T 8/171* (2006.01)

(52) U.S. Cl.
CPC .......... *B60T 7/22* (2013.01); *B60Q 9/00* (2013.01); *B60T 8/171* (2013.01)

(58) Field of Classification Search
CPC .......... B60T 7/22; B60T 8/171; B60Q 9/00
See application file for complete search history.

(56) References Cited

U.S. PATENT DOCUMENTS

| | | | |
|---|---|---|---|
| 6,057,754 A | 5/2000 | Kinoshita | |
| 6,680,689 B1* | 1/2004 | Zoratti | B60Q 9/008 340/436 |
| 8,554,438 B2 | 10/2013 | Nakayama | |
| 2015/0149037 A1 | 5/2015 | Hyung | |
| 2017/0029026 A1* | 2/2017 | Okuda | B62D 15/025 |
| 2018/0118176 A1* | 5/2018 | Lesher | B60T 7/12 |
| 2018/0237007 A1* | 8/2018 | Adam | B60W 50/14 |
| 2018/0273051 A1 | 9/2018 | Amato | |
| 2019/0056738 A1* | 2/2019 | Prasad | G06V 20/58 |
| 2020/0133295 A1* | 4/2020 | Indrakanti | G06T 7/0002 |
| 2023/0140569 A1* | 5/2023 | Foster | B60W 30/18159 701/400 |

FOREIGN PATENT DOCUMENTS

| | | |
|---|---|---|
| DE | 102012107188 A1 | 2/2014 |
| JP | 2004038858 A | 2/2004 |

* cited by examiner

*Primary Examiner* — Anne Marie Antonucci
*Assistant Examiner* — Patrick M Brady
(74) *Attorney, Agent, or Firm* — Cheryl L. Greenly; Brian E. Kondas; Geoffrey A. Kudlo

(57) ABSTRACT

A vehicle system includes a braking controller for implementing service braking in response to a brake request message, a lane departure warning controller for transmitting a message indicative of a vehicle departing a defined roadway and an automatic emergency braking controller for detecting objects in front of the vehicle. The automatic emergency braking controller uses a first filtering mode for object detection and transmits a braking request message in response to an object detection. The automatic emergency braking controller filters objects in a second filtering mode when the lane departure warning controller transmits a message indicating the vehicle has departed the defined roadway.

6 Claims, 2 Drawing Sheets

VEHICLE BRAKING METHOD AND SYSTEM

BACKGROUND

The present application relates to a system and method to provide expanded braking functionality when a vehicle, such as a commercial vehicle, equipped with automatic emergency braking (AEB) unintentionally departs a roadway.

In some commercial vehicle applications, different controllers control service braking, lane departure warning and automatic emergency braking. Various sensors installed throughout the vehicle provide the information used in these controllers to determine when and how much deceleration is necessary to avoid obstacles, which include other roadway users and infrastructure. The information from the same sensors used in obstacle detection or different sensors will determine what interventions, if any, are necessary to warn the driver of unintentional lane change and/or maintain the vehicle in its lane of travel. Each controller provides signals to alert or warn drivers to potentially hazardous driving situations. The controllers determine how much and how often a braking intervention may be required to decelerate or otherwise maneuver the vehicle to maintain safe operation. Therefore, there is interest in improving the braking functionality and interaction of the controllers based on the sensor input and presence of different control systems on the vehicle.

SUMMARY

In accordance with one embodiment, a vehicle system includes a braking controller for implementing service braking in response to a deceleration request message, a lane departure warning controller for transmitting a message indicative of the host vehicle departing a defined roadway and an automatic emergency braking controller for detecting objects in front of the vehicle. The automatic emergency braking controller uses a first filtering mode for object detection and transmits a deceleration request message in response to an object detection. The automatic emergency braking controller filters objects in a second filtering mode when the lane departure warning controller transmits a message indicating the vehicle has departed the defined roadway.

In accordance with another embodiment, a method for controlling a braking system of a vehicle includes setting an automatic emergency braking controller in a first filtering mode. A lane departure warning system will detect a departure of the vehicle from a roadway. The automatic emergency braking controller will be set in a second filtering mode to mitigate collision with an obstacle in front of the vehicle in response to the departure of the vehicle from the roadway.

DETAILED DESCRIPTION

Figure 1:
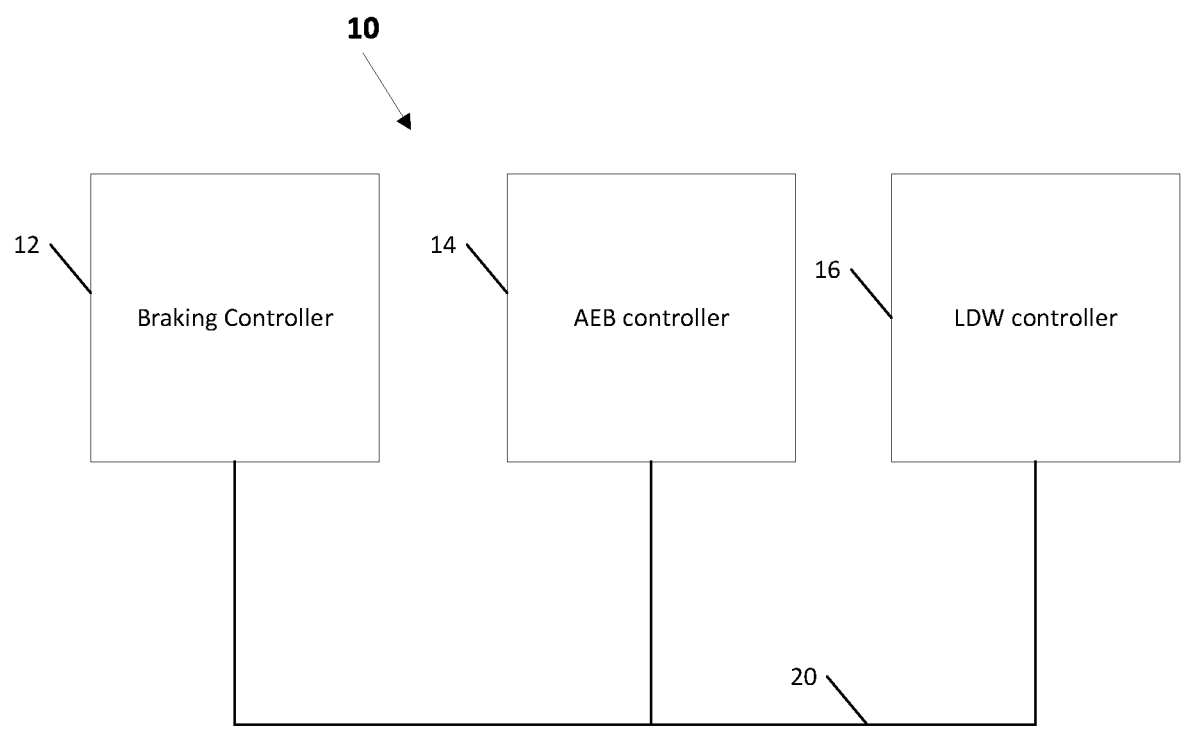
FIG. 1 is a representation of a system on a host vehicle, such as a commercial vehicle, according to one example of the present invention.

Referring to FIG. 1, a system 10 for a host vehicle, such as a commercial vehicle, according to one example of this invention is shown. The vehicle system 10 includes a braking controller 12, which controls the service braking of vehicle under certain conditions. Braking controller 12 may include functionality to control anti-lock braking, stability control, and rollover protection. Braking controller 12 responds to signals from sensors connected directly to the braking controller 12 or responds to deceleration request messages received from other controllers on the vehicle. In commercial vehicle applications having pneumatic braking systems, the braking controller 12 transmits signals to activate electropneumatic devices at each wheel end. The electropneumatic devices are part of the service braking system and assist in slowing and stopping the vehicle, either before the driver intervenes or in addition to driver intervention.

The system 10 includes an automatic emergency braking (AEB) controller 14, which transmits messages regarding potential obstacles in front of the vehicle. The AEB controller 14 may receive information about the obstacles from sensors affixed to the vehicle, such as cameras, radars, LIDAR, ultrasonic sensors and other sensing devices. These sensors are positioned to detect obstacles in front of the vehicle. Specifically, the AEB controller 14 is looking for other vehicles traveling on the same roadway that may be slowing down or moving into the host vehicle's lane of travel. In general, the AEB controller 14 does not use or act upon, thereby essentially filtering out, all stationary objects the sensors may detect, such as bridges, guardrails and signs, when determining if braking is necessary to mitigate a collision. The purpose of the filtering of stationary objects when determining if braking is necessary is to limit false warnings to the driver and unnecessary service brake activations.

The system 10 includes a lane departure warning (LDW) controller 16, which transmits messages regarding whether the vehicle is staying between the lane markings while the vehicle is traveling on a roadway. The LDW controller 16 may receive signals about the lane markings from sensors affixed to the vehicle and looking to the front of the vehicle, such as cameras or LIDAR. The LDW controller 16 may also determine when the vehicle is no longer on the roadway based on all of the detected lane markings being to the right or the left of the vehicle.

In another example, the AEB controller 14 may include the functionality for highway departure braking, where the AEB controller 14 uses its own sensors to determine that the vehicle has left the roadway. In this instance, a separate LDW controller may not be required.

The braking controller 12, the AEB controller 14 and the LDW controller 16 communicate on a vehicle serial communication bus 20. Messages, such as a deceleration request message, may be transmitted and received using a known protocol, such as SAE J1939, on the communication bus 20.

The AEB controller 14 transmits deceleration request messages on the communication bus 20 when the AEB controller 14 determines that service braking may be necessary to mitigate a collision. The level of deceleration requested depends on the velocity of the host vehicle and the location of the obstacle. The level of deceleration requested may also depend on the available braking power within the service braking system of the vehicle. For example, in a pneumatic braking system, the level of braking available is limited by the amount of pressure stored in the service braking reservoirs. The braking controller 12 responds to the deceleration request messages by activating the service brakes automatically to slow or stop the vehicle.

The LDW controller 16 transmits messages on the communication bus 20 when the LDW controller 16 determines that the vehicle is out of a lane of travel or off the roadway entirely. The AEB controller 14 receives these messages and will respond to the determination that the vehicle has departed the roadway by removing the filtering of stationary objects, entering a second filtering mode. The AEB controller 14 may respond by transmitting a deceleration request message on the communication bus 20 to the braking controller 12 to request service braking at the maximum limit of brake pressure available in order to prevent further highway departure or mitigate the impact on a detected obstacle.

In another example, the functions of each type of controller, the braking controller 12, the AEB controller 14, and the LDW controller 16 may be combined together in a single controller.

Therefore, a vehicle system includes a braking controller for implementing service braking in response to a deceleration request message, a lane departure warning controller for transmitting a message indicative of a vehicle departing a defined roadway and an automatic emergency braking controller for detecting objects in front of the vehicle. The automatic emergency braking controller uses a first filtering mode for object detection and transmits a deceleration request message in response to an object detection. The automatic emergency braking controller filters objects in a second filtering mode when the lane departure warning controller transmits a message indicating the vehicle has departed the defined roadway.

Figure 2:
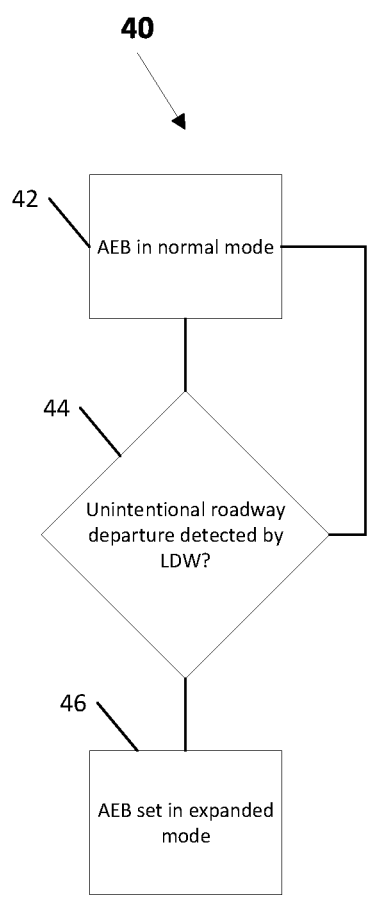
FIG. 2 is a flowchart of the operation of the vehicle having a system as in FIG. 1.

FIG. 2 shows a method 40 of implementing the expanded braking using the system 10.

In step 42, the AEB controller 14 is in a first, or normal, filtering mode. In this first filtering mode, stationary objects, such as signs, guardrails and bridges, are being filtered out. In general, when the host vehicle is driving properly on a roadway, the sensors still recognize metallic objects such as bridges, guardrails and signs that may be within the field of vision of the sensor but are outside of the lane of travel of the vehicle. The filtering out of stationary objects while the host vehicle is on the roadway helps minimize false alerts and unnecessary braking interventions. The first filtering mode may also beneficially decrease processing time of the information that the AEB controller 14 receives from the sensors. When the stationary object is filtered out, it is not being acted upon as an obstacle as the AEB controller 14 makes a determination of whether to request deceleration.

In step 44, the LDW controller 16 determines whether an unintentional roadway departure has occurred. In general, a driver is to turn off the LDW system if he has an intentional roadway departure, such as to maneuver around a construction zone. If no unintentional departure of the roadway has occurred, the method 40 returns to step 42 and the AEB controller 14 remains in the first filtering mode.

If an unintentional departure has occurred in step 44, the method proceeds to step 46. An unintentional departure of the roadway occurs when all of the lane markings are to the left or the right of the vehicle and the driver did not turn off the lane departure warning feature. The LDW controller 16 may also indicate an unintentional departure of the roadway if it detects that a) the driver did not actuate the turn signal, b) the driver did not actuate the hazard signal, c) the driver is not intentionally steering the vehicle, as determined by the steering angle or steering rate of change, d) the driver is not applying the brakes, or e) the driver is not applying the vehicle throttle above a predetermined threshold for a period of time. Unintentional departure of the roadway may occur if the driver has fallen asleep at the wheel, for example. Upon determining that an unintentional departure of the roadway by the host vehicle has occurred, the AEB controller 14 is set to a second, or expanded, filtering mode.

In the second filtering mode, the stationary obstacles that may be detected in front of the host vehicle, such as the guardrails, bridges and signs, are no longer filtered out. The AEB controller 14 may transmit a deceleration request message to the braking controller 12 via the communications bus 20 in response to these stationary obstacles since it is more likely that the vehicle could collide with the stationary objects when off of the roadway. The deceleration request would be at the maximum deceleration level available, similar to the request used if a potential collision was detected with respect to a moving obstacle. In this manner, the vehicle may avoid or minimize a collision with those stationary obstacles and stop faster when an unintentional departure of the roadway occurs.

The host vehicle may be stopped via braking intervention by the driver or by automatic intervention by the braking controller 12 in response to the deceleration request messages when the host vehicle departs the roadway. Avoidance of further damage to the vehicle through avoidance of stationary objects can be done with implementation of this method 40.

Therefore, a method for controlling a braking system of a vehicle includes setting an automatic emergency braking controller in a first filtering mode. A lane departure warning controller will detect a departure of the vehicle from a roadway. The automatic emergency braking controller will be set in a second filtering mode to mitigate collision with an obstacle in front of the vehicle in response to the departure of the vehicle from the roadway.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A vehicle system for a host vehicle comprising:
   a braking controller for implementing service braking in response to a deceleration request message;
   a lane departure warning controller for transmitting a message indicative of the host vehicle departing a defined roadway; and
   an automatic emergency braking controller for detecting objects in front of the host vehicle using a first filtering mode in response to the host vehicle being on the defined roadway, and for detecting objects in a second filtering mode when the lane departure warning controller transmits a message indicating the host vehicle has departed the defined roadway, wherein the first filtering mode does not recognize stationary objects in front of the vehicle in determining whether the automatic emergency braking controller will transmit the deceleration message, thereby not decelerating the vehicle when stationary objects are present, and the second filtering mode does recognize the stationary objects in front of the vehicle and in response the automatic emergency braking controller transmits the deceleration request message to the braking controller to implement service braking when any object is detected in the front of the host vehicle while in the second filtering mode, thereby decelerating the vehicle when stationary objects are present.

2. The vehicle system as in claim 1, wherein the braking controller activates all of the service braking power available in response to the deceleration request message.

3. The vehicle system as in claim 1, wherein any of the braking controller, the lane departure warning controller and the automatic braking controller are combined in a single controller.

4. The vehicle system as in claim 1, wherein the system is installed on a commercial vehicle having a pneumatic braking system.

5. A method for controlling a braking system of a host vehicle comprising:

setting automatic emergency braking controller in a first filtering mode, wherein the first filtering mode filters out stationary objects in front of the host vehicle, thereby not decelerating the vehicle when stationary objects are present;

detecting a departure of the host vehicle from a roadway;

setting the automatic emergency braking controller in a second filtering mode in response to the departure of the host vehicle from the roadway, wherein the second filtering mode detects stationary objects in front of the host vehicle;

transmitting a deceleration request in response to detecting a stationary object in front of the host vehicle while in the second filtering mode; and applying service braking on the host vehicle to mitigate collision with the stationary object detected in the second filtering mode in front of the host vehicle in response to the departure of the host vehicle from the roadway.

6. The method as in claim 5, wherein the automatic emergency braking controller also performs the detection of the departure of the host vehicle from the roadway.

\* \* \* \* \*